United States Patent
Hara (10) Patent No.: US 9,203,988 B2
(45) Date of Patent: Dec. 1, 2015

(54) IMAGE FORMING APPARATUS AND IMAGE FORMING SYSTEM

(71) Applicant: KYOCERA DOCUMENT SOLUTIONS INC., Osaka (JP)

(72) Inventor: Hiroyuki Hara, Osaka (JP)

(73) Assignee: KYOCERA Document Solutions, Inc., Osaka (JP)

(*) Notice: Subject to any disclaimer, the term of this patent is extended or adjusted under 35 U.S.C. 154(b) by 0 days.

(21) Appl. No.: 14/297,947

(22) Filed: Jun. 6, 2014

(65) Prior Publication Data

US 2014/0376041 A1 Dec. 25, 2014

(30) Foreign Application Priority Data

Jun. 21, 2013 (JP) ................................. 2013-130819

(51) Int. Cl.
| | | |
|---|---|---|
| G06F 3/12 | (2006.01) | |
| H04N 1/00 | (2006.01) | |
| H04L 29/06 | (2006.01) | |
| H04L 29/08 | (2006.01) | |

(52) U.S. Cl.
CPC ........ *H04N 1/00312* (2013.01); *H04L 65/1006* (2013.01); *H04L 65/1069* (2013.01); *H04L 67/02* (2013.01); *H04N 1/001* (2013.01); *H04N 1/00244* (2013.01); *H04N 1/00464* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 7,295,543 | B2* | 11/2007 | Kikuchi et al. | 370/338 |
| 7,756,106 | B2* | 7/2010 | Nakao et al. | 370/352 |
| 7,966,625 | B2* | 6/2011 | Gilfix et al. | 719/330 |
| 8,949,854 | B2* | 2/2015 | Ramanathan et al. | 719/311 |
| 2005/0018657 | A1* | 1/2005 | Nakao et al. | 370/352 |
| 2005/0058143 | A1* | 3/2005 | Kikuchi et al. | 370/401 |
| 2007/0136422 | A1* | 6/2007 | Ohtani et al. | 709/204 |
| 2007/0189258 | A1* | 8/2007 | Kikuchi et al. | 370/338 |
| 2008/0104238 | A1* | 5/2008 | Gilfix et al. | 709/225 |
| 2008/0198986 | A1* | 8/2008 | Tonegawa | 379/100.17 |
| 2012/0106400 | A1* | 5/2012 | Rahman | 370/259 |
| 2012/0185573 | A1* | 7/2012 | Ramanathan et al. | 709/219 |
| 2012/0262757 | A1* | 10/2012 | Ohuchi et al. | 358/1.15 |

FOREIGN PATENT DOCUMENTS

JP 2012-090025 A 5/2012

* cited by examiner

*Primary Examiner* — Marcus T Riley
(74) *Attorney, Agent, or Firm* — Studebaker & Brackett PC (57) ABSTRACT

An image forming apparatus includes a SIP controlling section, a web screen obtaining section, a display device, a first web controlling section, and a second web controlling section. The SIP controlling section establishes a connection with another image forming apparatus on the reception side, by communicating with a SIP server. The web screen obtaining section obtains information about a web screen by making a request to a web server. The first web controlling section executes the application on the basis of the operation performed on the web screen displayed by the display device and transmits/receives image data to/from the image forming apparatus on the reception side through the connection. The second web controlling section executes the application on the basis of the operation performed on the web screen displayed by the display device and transmits/receives audio data to/from the image forming apparatus on the reception side through the connection.

13 Claims, 6 Drawing Sheets

IMAGE FORMING APPARATUS AND IMAGE FORMING SYSTEM

INCORPORATION BY REFERENCE

The present application claims priority under 35 U.S.C. §119 to Japanese Patent Application No. 2013-130819, filed Jun. 21, 2013. The contents of this application are incorporated herein by reference in their entirety.

BACKGROUND

The present disclosure relates to an image forming apparatus that performs communication involving images and audio according to the Session Initiation Protocol (SIP) and an image forming system that includes the image forming apparatus.

Examples of image forming apparatuses that are known include printers and multifunction peripherals (MFPs). Some MFPs have both a facsimile (fax) function and a telephone function.

However, many of the MFPs described above are configured in such a manner that the telephone function and the fax function cannot be used at the same time. When using an MFP configured in such a manner, if the user wishes to use the fax function (e.g., transmit/receive image data to/from the party with which the user is having a call session), while using the telephone function (e.g., during the call session), it is considered to be necessary to stop the call session first so as to disconnect the telephone connection and to subsequently establish a fax connection. Further, it is considered that, when the transmission/reception of the image data using the fax function has been finished, it is necessary to disconnect the fax connection before establishing a telephone connection again.

To enable the user, even during a call session, to transmit/receive image data by using the fax function to/from a party with which the user is having the call session, a communication system as follows has been proposed: In this communication system, an MFP and a telephone machine are connected to a gateway apparatus. Further, the gateway apparatus is connected to another gateway apparatus via a SIP server. In the communication system configured in this manner, it is considered to be possible to transmit/receive image data by employing the MFP connected to the gateway apparatus to which the telephone machine is connected, while the user is having a call session on the telephone machine.

SUMMARY

An image forming apparatus of the present disclosure includes a SIP controlling section, a web screen obtaining section, a display device, a first web controlling section, and a second web controlling section. The SIP controlling section is configured to establish a connection with another image forming apparatus on the reception side, by communicating with a SIP server. The web screen obtaining section is configured to obtain information about a web screen by making a request to a web server, the web screen being used for receiving an operation to execute an application in the web server. The display device is configured to display the web screen. The first web controlling section is configured to execute the application on the basis of the operation performed on the web screen displayed by the display device and to transmit/receive image data to/from the image forming apparatus on the reception side through the connection. The second web controlling section is configured to execute the application on the basis of the operation performed on the web screen displayed by the display device and to transmit/receive audio data to/from the image forming apparatus on the reception side through the connection.

An image forming system of the present disclosure includes an image transmitting apparatus, an image forming apparatus, a SIP server, and a web server. The SIP server includes a connection establishing section configured to establish a connection between the image transmitting apparatus and the image forming apparatus. The web server includes: an image transmitting/receiving section configured to transmit/receive image data through the connection; and an audio transmitting/receiving section configured to transmit/receive audio data through the connection. The image transmitting apparatus includes: a SIP controlling section configured to establish the connection by giving an instruction to the connection establishing section; a first web controlling section configured to transmit the image data to the image forming apparatus by giving an instruction to the image transmitting/receiving section; and a second web controlling section configured to transmit the audio data to the image forming apparatus by giving an instruction to the audio transmitting/receiving section.

DETAILED DESCRIPTION

The following describes embodiments of the present disclosure. First, a configuration of an image forming system 10 according to an embodiment will be explained, with reference to FIG. 1.

Figure 1:
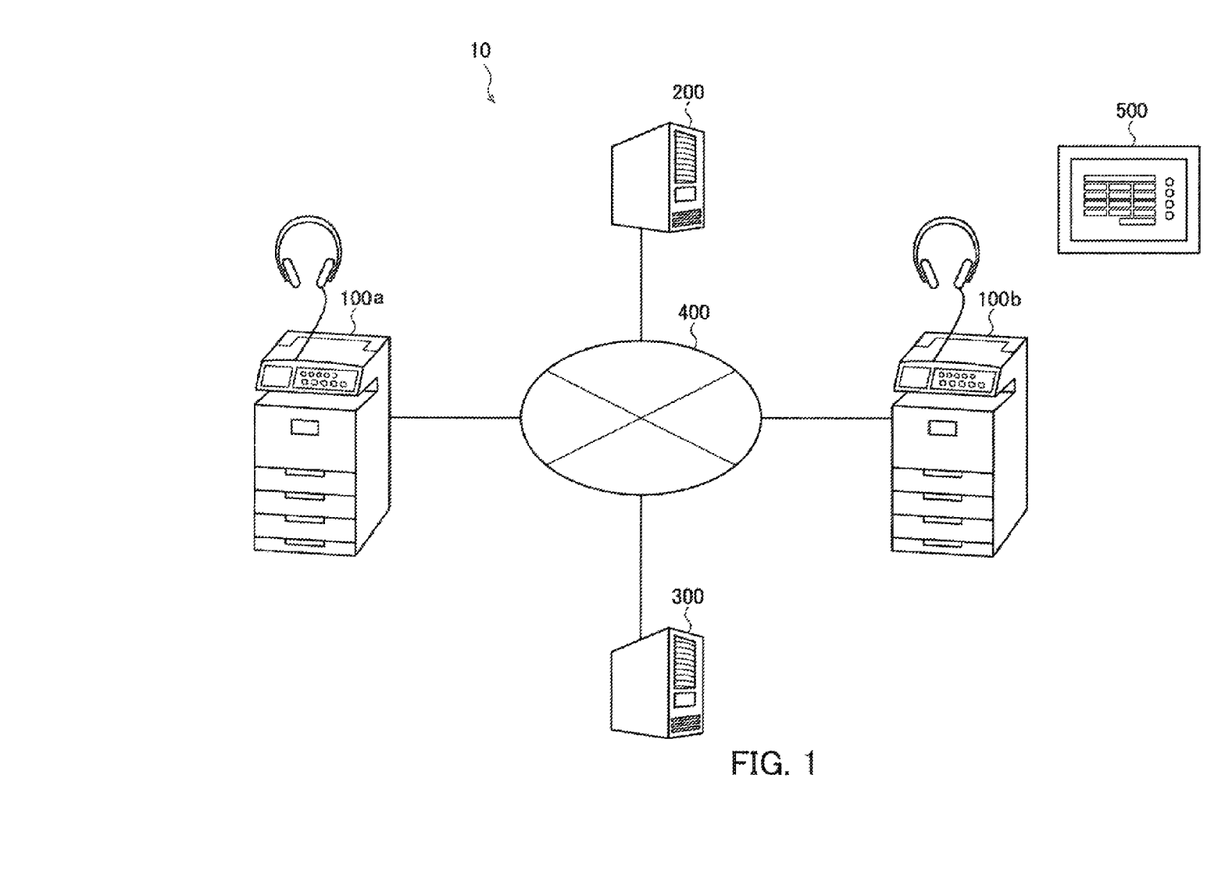
FIG. 1 is a drawing of a configuration of an image forming system according to an embodiment of the present disclosure.

As shown in FIG. 1, the image forming system 10 includes image forming apparatuses 100a and 100b, a SIP server 200, a web server 300, and a network 400. In the explanation below, when the image forming apparatuses 100a and 100b do not need to be distinguished from each other (when the characteristics thereof in common, for example, are described), each of the image forming apparatuses 100a and 100b will be referred to as an image forming apparatus 100.

For example, each of the image forming apparatuses 100 may be a printer or a multifunction peripheral (MFP). Each of the image forming apparatuses 100 has a SIP communication function. Each of the image forming apparatuses 100 is capable of both transmitting/receiving image data and transmitting/receiving audio data through a single connection (hereinafter, "SIP connection") that is established on the basis of the SIP communication function.

For example, when the image forming apparatus 100a is to communicate with the image forming apparatus 100b, the image forming apparatus 100a communicates with the SIP server 200 so that a connection (a SIP connection) with the image forming apparatus 100b is established. When the SIP connection has been established, the image forming apparatus 100a and the image forming apparatus 100b are able to communicate with each other by using at least one type of protocol selected from among the T.38 protocol, the Realtime Transport Protocol (RTP), the Hypertext Transfer Protocol (HTTP), and the File Transfer Protocol (FTP). T.38 is a protocol that specifies a real-time Group 3 facsimile communication procedure in an Internet Protocol (IP) network. RTP is a data transfer protocol used for transmitting a data stream containing audio or moving pictures in a real-time manner.

The SIP server 200 includes a connection establishing section that establishes the connection (the SIP connection) between the image forming apparatus 100a and the image forming apparatus 100b. In response to a request from one of the image forming apparatuses 100a and 100b, the connection establishing section establishes the SIP connection by exercising call control according to SIP on the other of the image forming apparatuses 100a and 100b. More specifically, the connection establishing section brings the Internet Protocol (IP) address of the image forming apparatus 100a into correspondence with an IP address of the image forming apparatus 100b. Further, in response to a request from one of the image forming apparatuses 100a and 100b, the connection establishing section disconnects the SIP connection by performing a call control cancelling process according to SIP on the other of the image forming apparatuses 100a and 100b.

Via the network 400, the web server 300 provides the image forming apparatuses 100 with an application (hereinafter, "web application") that is executable by the image forming apparatuses 100. The web application includes an image transmitting/receiving section that transmits/receives image data through a SIP connection and an audio transmitting/receiving section that transmits/receives audio data through a SIP connection. The web application is not downloaded into the image forming apparatuses 100. Each of the image forming apparatuses 100 is able to execute the application (the web application) in the web server 300 via the network 400, on the basis of an operation performed on a web screen 500.

The web server 300 includes a web screen transmitting section that transmits information about the web screen 500 to each of the image forming apparatuses 100. The web screen 500 is a screen used for receiving the operation to execute the application in the web server 300. The web screen 500 is provided for each of the image forming apparatuses 100 from the web server 300 and is displayed by a display device (e.g., an operating panel 104 described below) of each of the image forming apparatuses 100. For example, when the image forming apparatus 100a and the image forming apparatus 100b communicate with each other, the display device of the image forming apparatus 100a and the display device of the image forming apparatus 100b display mutually the same web screen 500 (i.e., a synchronized screen). By performing an operation on the web screen 500, the user is able to instruct the image transmitting/receiving section of the web application to transmit or receive image data and is able to instruct the audio transmitting/receiving section of the web application to transmit or receive audio data.

The network 400 is an IP network such as the Internet or an intranet, for example. The image forming apparatuses 100a and 100b, the SIP server 200, and the web server 300 are connected so as to be able to communicate with one another via the network 400.

Next, a configuration of the image forming apparatuses 100 will be explained, primarily with reference to FIG. 2.

Figure 2:
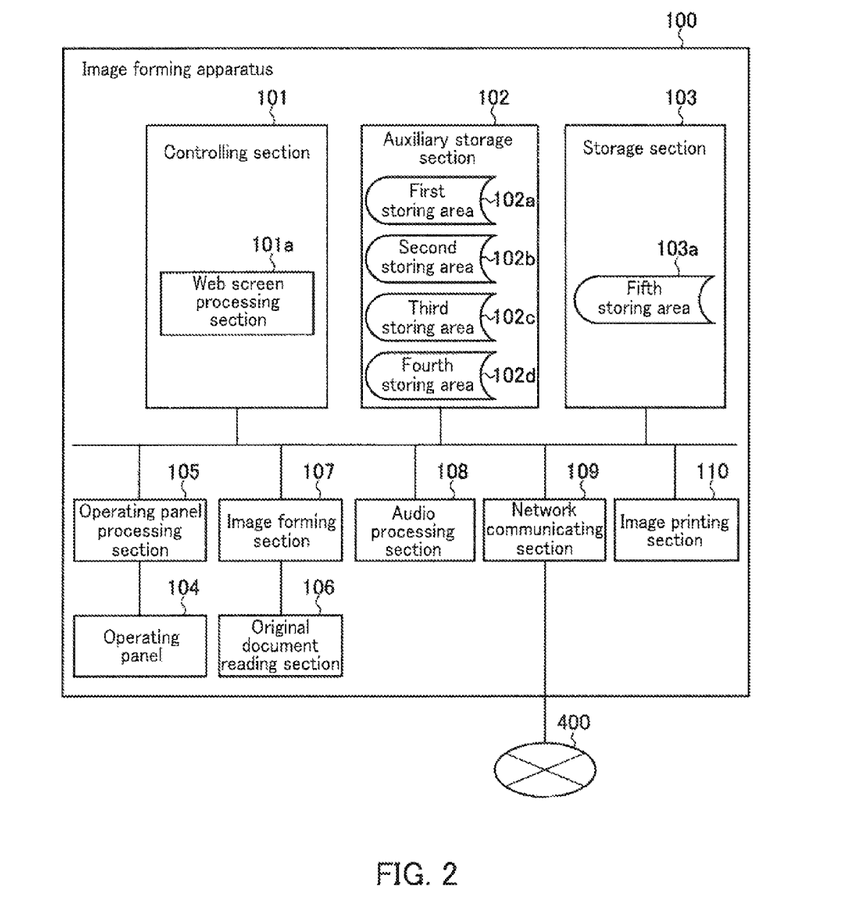
FIG. 2 is a diagram showing a functional configuration of an image forming apparatus included in the image forming system shown in FIG. 1.

As shown in FIG. 2, each of the image forming apparatuses 100 includes a controlling section 101, an auxiliary storage section 102, a storage section 103, the operating panel 104, an operating panel processing section 105, an original document reading section 106, an image forming section 107, an audio processing section 108, a network communicating section 109, and an image printing section 110. The controlling section 101, the auxiliary storage section 102, the storage section 103, the operating panel processing section 105, the image forming section 107, the audio processing section 108, the network communicating section 109, and the image printing section 110 each have an Input/Output (I/O) port of any of various types and are connected by a bus or the like so as to be able to communicate with one another. Further, each of the image forming apparatuses 100 includes an interface such as a Universal Serial Bus (USB), a bus controller, and the like. Further, the controlling section 101 is capable of controlling the functional elements that are connected thereto so as to be able to communicate therewith.

The network communicating section 109 includes a Local Area Network (LAN) interface that is detachable. The image forming apparatus 100 is connected to the network 400 via the network communicating section 109. The LAN interface has a function of performing intelligent communication on the basis of various types of network protocols such as the Transmission Control Protocol/Internet Protocol (TCP/IP), AppleTalk, or the Server Message Block (SMB) protocol.

The operating panel 104 has both functions of an input device and functions of a display device. The operating panel 104 is configured with, for example, a touch panel. The operating panel 104 displays an operating menu and receives an operation from the user's finger. The operating panel 104 displays the web screen 500 and the like. In place of the touch panel, an input device such as a mouse or a keyboard and a display device such as a Liquid Crystal Display (LCD) or an Electroluminescence Display (ELD) may be used.

The operating panel processing section 105 causes the operating panel 104 to display a predetermined screen (e.g., operating items representing functions with which the image forming apparatus 100 is provided) and processes data (operating data) input by the user by operating the operating panel 104. Further, according to an instruction from a web screen processing section 101a, the operating panel processing section 105 causes the operating panel 104 to display the web screen 500.

The controlling section 101 includes a processor, a Read-Only Memory (ROM) and a Random Access Memory (RAM). The processor may be, for example, a Micro Processing Unit (MPU) or a Central Processing Unit (CPU). The processor of the controlling section 101 is capable of executing any of computer programs (hereinafter, "programs") stored in the ROM, the auxiliary storage section 102, and the storage section 103.

The controlling section 101 includes: a web screen obtaining section that obtains the information about the web screen 500 by making a request to the web server 300; and a web screen transmitting section that transmits the information about the web screen 500 obtained from the web server 300 to another image forming apparatus.

The controlling section 101 causes the operating panel 104 to display the web screen 500. More specifically, the controlling section 101 includes the web screen processing section 101a. The web screen processing section 101a transmits the request for the web screen 500 to the web server 300 and causes the operating panel 104 to display the received web screen 500.

The controlling section 101 includes a SIP controlling section that establishes the SIP connection by communicating with the SIP server 200. In the present embodiment, the web screen processing section 101a corresponds to the SIP controlling section. More specifically, the web screen processing section 101a executes the web application on the basis of an operation performed on the web screen 500 and instructs the connection establishing section included in the SIP server 200 to establish or disconnect the SIP connection.

Further, the web screen processing section 101a executes the web application (more specifically, the image transmitting/receiving section) on the basis of an operation performed on the web screen 500 displayed by the operating panel 104 and transmits or receives the image data through the SIP connection. Further, the web screen processing section 101a executes the web application (more specifically, the audio transmitting/receiving section) on the basis of an operation performed on the web screen 500 displayed by the operating panel 104 and transmits or receives the audio data through the SIP connection. In the present embodiment, the web screen processing section 101a corresponds to the first web controlling section and to the second web controlling section.

The controlling section 101 further includes a print requesting section that requests another image forming apparatus to perform a printing process; a call session requesting section that requests another image forming apparatus to have a call session; an audio recording controlling section that controls operations related to recording of audio; and a print/call session controlling section that controls printing of image data and playing back of audio data. Further, the controlling section 101 further includes: an answering-machine-mode setting section that turns the answering machine mode on; and an answering-machine-mode notifying section that, when having received a call session request from another image forming apparatus while the answering machine mode is on, transmits an answering-machine-mode notice indicating that nobody is available to answer the telephone call and thus the answering machine mode is on, to the requesting image forming apparatus. The audio recording controlling section performs an audio recording process when having received the answering-machine-mode notice.

The original document reading section 106 reads an original document placed on a copy holder of the image forming apparatus 100. When the user has instructed the image forming apparatus 100 to read the original document via the operating panel 104, information (a reading request) indicating that the instruction was issued is sent to the original document reading section 106. When having received the reading request, the original document reading section 106 reads the original document placed on the copy holder and generates image data corresponding to the original document.

The image forming section 107 converts the image data generated by the original document reading section 106 into a data format that is transmittable by fax or by electronic mail (e-mail) or into a data format that is printable.

The audio processing section 108 converts an electric signal (e.g., an analog signal) that has been input thereto from an audio input device (e.g., a microphone) into predetermined audio data (e.g., a digital signal) by performing a predetermined signal processing process (e.g., an analog/digital conversion process, a noise cancelling process, a compressing process, and/or the like) thereon. Further, the audio processing section 108 converts audio data (e.g., a digital signal) into a predetermined electric signal (e.g., an analog signal) by performing a predetermined signal processing process (e.g., a digital/analog conversion process, a restoring process, and/or the like) thereon and outputs the electric signal to an audio output device (e.g., a speaker or earphones).

The audio processing section 108 converts audio into predetermined audio data and records the audio data (into, for example, a third storing area 102c, which is explained later). Further, the audio processing section 108 plays back audio data stored in the auxiliary storage section 102 or the storage section 103. For example, when having received the information (the answering-machine-mode notice) indicating that the answering machine mode is turned on, the audio processing section 108 starts a predetermined audio recording operation. During the audio recording operation, the audio processing section 108 converts an electric signal that has been input thereto from an audio input device, for example, into predetermined audio data by performing a predetermined signal processing process thereon and stores the audio data into the auxiliary storage section 102 (more specifically, the third storing area 102c, which is explained later). The audio processing section 108 ends the audio recording operation when, for example, a predetermined period of time has elapsed since the start of the audio recording operation.

The image printing section 110 receives a request to perform a printing process (hereinafter, "printing request") and printing conditions (an image to be printed, one side/both sides, the number of copies, and so on) from the user and prints the image on copy paper or the like according to the received printing conditions. If no printing conditions are specified by the user, the image printing section 110 prints the image by using predetermined printing conditions.

The auxiliary storage section 102 stores therein programs or data that are processable by a computer. The auxiliary storage section 102 may be configured with, for example, a flash memory. The auxiliary storage section 102 stores therein, for example, a program or data of processes executed by the controlling section 101. In the auxiliary storage section 102, a first storing area 102a, a second storing area 102b, the third storing area 102c, and a fourth storing area 102d are provided.

The first storing area 102a (a web screen information storing area) stores therein the information about the web screen 500. The web screen 500 is used for executing the application provided for each of the image forming apparatuses 100 from the web server 300.

The second storing area 102b (a transmitted image storing area) stores therein image data to be transmitted to another image forming apparatus. For example, when the image forming apparatus 100a transmits image data to the image forming apparatus 100b and requests the image forming apparatus 100b to print the image data, the image data is temporarily stored in the second storing area 102b of the image forming apparatus 100a.

The third storing area 102c (a recorded audio storing area) stores therein audio data to be transmitted to another image forming apparatus. For example, when the image forming apparatus 100b is set in the answering machine mode, audio data recorded by the image forming apparatus 100a is stored in the third storing area 102c of the image forming apparatus 100a.

The fourth storing area 102d (an answering machine information storing area) stores therein information related to the answering machine mode. For example, when a printing request or a call session request is made by the image forming apparatus 100a while the image forming apparatus 100b is set in the answering machine mode, information (a received-call history) indicating that the request was made is stored in the fourth storing area 102d of the image forming apparatus 100b.

The storage section 103 stores therein data or programs that are processable by a computer. The storage section 103 may be configured with, for example, a hard disk drive. The storage section 103 includes a fifth storing area 103a (an original document image data storing area). The fifth storing area 103a stores therein, for example, the image data converted into the predetermined data format by the image forming section 107 and the image data or the audio data received by the network communicating section 109.

Figure 3:
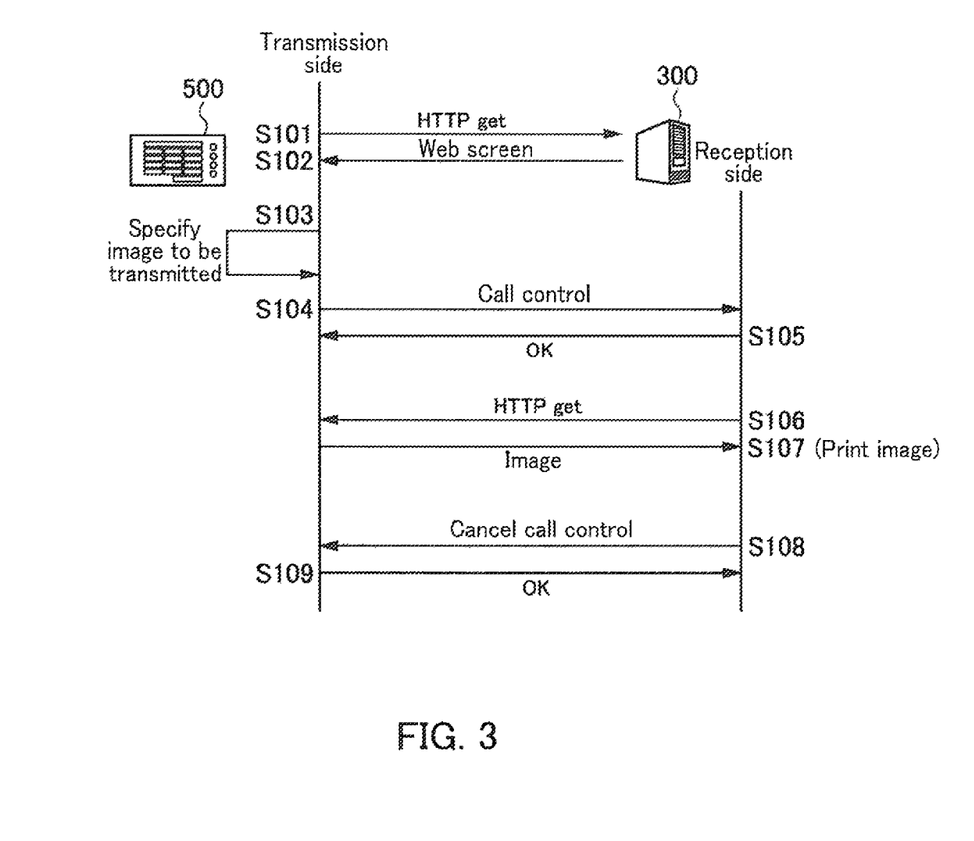
FIG. 3 is a chart showing a procedure in a print requesting process according to the embodiment of the present disclosure.

Next, the printing request and a process related to a printing process performed on the basis of the printing request in the image forming system 10 will be explained, primarily with reference to FIG. 3.

For example, when the image forming apparatus 100a requests the image forming apparatus 100b to perform a printing process, the image forming apparatus 100a transmits image data to the image forming apparatus 100b. Further, the image forming apparatus 100b receives the image data transmitted from the image forming apparatus 100a and prints the received image data. In the example illustrated in FIG. 3, when the call control for establishing a SIP connection is exercised on the image forming apparatus 100b, the print requesting section of the image forming apparatus 100a (the controlling section 101) requests the image forming apparatus 100b to perform a printing process.

More specifically, the image forming apparatus 100a, which is on the transmission side, performs the following process: First, when the user instructs via the operating panel 104 that the web screen 500 should be displayed, information (a display request) indicating that the instruction was issued is sent to the operating panel processing section 105, and the display request is further sent from the operating panel processing section 105 to the controlling section 101. When having received the display request, the controlling section 101 activates the web screen processing section 101a. After that, as a result of activating the web screen processing section 101a, a predetermined print requesting process is performed. The print requesting process is performed by, for example, executing the application (the web application) in the web server 300 via the web screen 500. The print requesting process performed by the image forming apparatus 100a on the transmission side will be explained below, primarily with reference to FIG. 3.

During the print requesting process mentioned above, first at step S101, by transmitting an HTTP get command (hereinafter, "HTTP get") to the web server 300, the web screen processing section 101a requests the web server 300 to transmit the web screen 500. When having received the request, the web server 300 transmits the web screen 500 to the image forming apparatus 100a.

After that, at step S102, the web screen processing section 101a receives the web screen 500 from the web server 300 and causes the operating panel 104 to display the received web screen 500.

Subsequently, at step S103, the user operates (touches) the web screen 500 (hereinafter, "transmission-side web screen 500") displayed by the operating panel 104 of the image forming apparatus 100a, so as to take out desired image data (image data to be printed) from the second storing area 102b of the auxiliary storage section 102 and to store the image data into a transmission box of the web application (e.g., a predetermined storage area in the web server 300 or a predetermined storage area in the image forming apparatus 100a).

After that, at step S104, the user operates (touches) the transmission-side web screen 500, so that call control according to SIP is exercised on the image forming apparatus 100b, which is on the reception side. In the example illustrated in FIG. 3, the call control corresponds to the printing request.

Next, a printing process performed by the image forming apparatus 100b on the reception side will be explained, primarily with reference to FIG. 3. The image forming apparatus 100b performs the printing process explained below, in response to the printing request (more specifically, the call control) mentioned above.

When the call control according to SIP described above is exercised, the image forming apparatus 100b (the controlling section 101) obtains an IP address of the image forming apparatus 100a on the transmission side. Subsequently, at step S105, the image forming apparatus 100b (the controlling section 101) transmits "OK" to the image forming apparatus 100a, as a response to the call control. As a result, a SIP connection is established, and SIP terminals (the image forming apparatuses 100a and 100b) are thus able to perform peer-to-peer communication with each other through the SIP connection.

After that, at step S106, by using an "HTTP get", the image forming apparatus 100b (the controlling section 101) requests the image forming apparatus 100a to transmit image data. When having received the request, the image forming apparatus 100a transmits the image data (the specified image data) stored in the transmission box used in the web application, to the image forming apparatus 100b through the SIP connection.

When the network communicating section 109 of the image forming apparatus 100b has received the image data, the received image data (the specified image data) is sent from the network communicating section 109 to the image printing section 110 at step S107. When having received the image data, the image printing section 110 prints the received image data by using predetermined conditions.

Next, a process performed after the printing process described above will be explained, primarily with reference to FIG. 3.

When the printing process described above has finished, the image forming apparatuses 100a and 100b each perform a call control cancelling process. More specifically, at step S108, the image forming apparatus 100b performs the call control cancelling process according to SIP on the image forming apparatus 100a. Subsequently, at step S109, the image forming apparatus 100a transmits "OK" to the image forming apparatus 100b, as a response to the call control cancelling process. As a result, the SIP connection is disconnected, and the peer-to-peer communication between the SIP terminals (the image forming apparatuses 100a and 100b) is ended.

Figure 4:
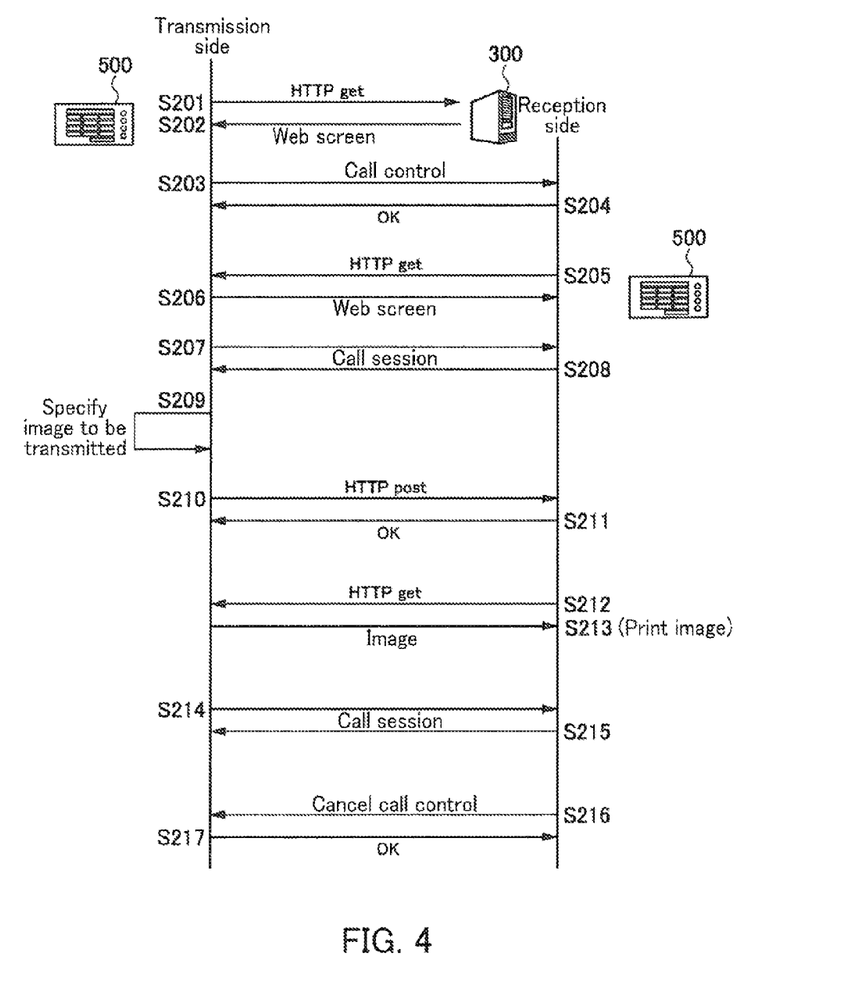
FIG. 4 is a chart showing a procedure in a print requesting process performed during a call session according to the embodiment of the present disclosure.

Next, a printing request during a call session and a process related to a printing process performed on the basis of the printing request in the image forming system 10 will be explained, primarily with reference to FIG. 4.

For example, when the image forming apparatus 100a currently having a call session requests the image forming apparatus 100b with which the image forming apparatus 100a is having the call session to perform a printing process, the image forming apparatus 100a transmits image data to the image forming apparatus 100b during the call session (without disconnecting the connection of the call session). Thus, the image forming apparatus 100b receives the image data transmitted from the image forming apparatus 100a during the call session (without disconnecting the connection of the call session) and prints the received image data. In the example illustrated in FIG. 4, when the image forming apparatus 100b has received a printing request from the image forming apparatus 100a while the image forming apparatus 100a and the image forming apparatus 100b are having a call session through a SIP connection, the print/call session controlling section of the image forming apparatus 100b (the controlling section 101) requests the image forming apparatus 100a to transmit image data and prints the image data received from the image forming apparatus 100a, while keeping the SIP connection established (without disconnecting the SIP connection).

More specifically, the image forming apparatus 100a on the transmission side performs the following process: First, when the user instructs via the operating panel 104 that the web screen 500 should be displayed, information (a display request) indicating that the instruction was issued is sent to the operating panel processing section 105, and the display request is further sent from the operating panel processing section 105 to the controlling section 101. When having received the display request, the controlling section 101 activates the web screen processing section 101a. After that, as a result of activating the web screen processing section 101a, a print requesting process during a call session is performed. The print requesting process during a call session is performed by, for example, executing the application (the web application) in the web server 300 via the web screen 500. The print requesting process during a call session performed by the image forming apparatus 100a on the transmission side will be explained below, primarily with reference to FIG. 4.

During the print requesting process mentioned above, first at step S201, by using an "HTTP get", the web screen processing section 101a requests the web server 300 to transmit the web screen 500. When having received the request, the web server 300 transmits the web screen 500 to the web screen processing section 101a of the image forming apparatus 100a.

After that, at step S202, the web screen processing section 101a receives the web screen 500 from the web server 300 and causes the operating panel 104 to display the received web screen 500. Further, the web screen processing section 101a stores the received information about the web screen 500 into the first storing area 102a of the auxiliary storage section 102.

Subsequently, at step S203, the user operates (touches) the transmission-side web screen 500, so that call control according to SIP is exercised on the image forming apparatus 100b on the reception side. When the call control is exercised, the image forming apparatus 100b (the controlling section 101) on the reception side obtains the IP address of the image forming apparatus 100a. Subsequently, at step S204, the image forming apparatus 100b (the controlling section 101) on the reception side transmits "OK" to the image forming apparatus 100a, as a response to the call control. As a result, a SIP connection is established, and the SIP terminals (the image forming apparatuses 100a and 100b) are thus able to perform peer-to-peer communication with each other through the SIP connection.

After that, at step S205, by using an "HTTP get", the image forming apparatus 100b (the controlling section 101) on the reception side requests the image forming apparatus 100a to transmit the web screen 500.

After that, at step S206, the image forming apparatus 100a transmits the information about the web screen 500 stored in the first storing area 102a of the auxiliary storage section 102 to the image forming apparatus 100b on the reception side. When having received the information about the web screen 500, the image forming apparatus 100b causes the operating panel 104 to display the web screen 500 on the basis of the received information.

Subsequently, the image forming apparatus 100a and the image forming apparatus 100b have a call session with each other through the SIP connection. During the call session, the image forming apparatus 100b receives audio data transmitted from the image forming apparatus 100a (step S207), whereas the image forming apparatus 100a receives audio data transmitted from the image forming apparatus 100b (step S208).

After that, at step S209, the user operates (touches) the transmission-side web screen 500, so as to take out desired image data (image data to be printed) from the second storing area 102b of the auxiliary storage section 102 and to store the image data into a transmission box used in the web application (e.g., a predetermined storage area in the image forming apparatus 100a or a predetermined storage area in the web server 300).

After that, at step S210, the user operates (touches) the transmission-side web screen 500, so that the controlling section 101 executes the web application and requests, by using an HTTP post command (hereinafter, "HTTP post"), the image forming apparatus 100b to print the image data. In the example illustrated in FIG. 4, the "HTTP post" corresponds to the printing request.

Next, a printing process performed by the image forming apparatus 100b on the reception side will be explained, primarily with reference to FIG. 4. The image forming apparatus 100b performs the printing process described below, in response to the printing request described above (more specifically, the "HTTP post"), during the call session (without disconnecting the SIP connection).

When having received the printing request described above, the image forming apparatus 100b transmits "OK" to the image forming apparatus 100a at step S211, as a response to the "HTTP post".

After that, at step S212, by using an "HTTP get", the image forming apparatus 100b (the controlling section 101) requests the image forming apparatus 100a to transmit image data. When having received the request, the image forming apparatus 100a transmits the image data (the specified image data) stored in the transmission box used in the web application to the image forming apparatus 100b through the SIP connection.

When the network communicating section 109 of the image forming apparatus 100b has received the image data, the received image data (the specified image data) is sent from the network communicating section 109 to the image printing section 110 at step S213. When having received the image data, the image printing section 110 prints the received image data by using the predetermined conditions.

Next, a process performed after the printing process described above will be explained, primarily with reference to FIG. 4.

The image forming apparatus 100a and the image forming apparatus 100b are able to keep having the call session through the SIP connection, even after the printing process described above is finished. During the call session, the image forming apparatus 100b receives audio data transmitted from the image forming apparatus 100a (step S214), whereas the image forming apparatus 100a receives audio data transmitted from the image forming apparatus 100b (step S215).

When the call session is ended, the image forming apparatuses 100a and 100b each perform a call control cancelling process. More specifically, at step S216, the image forming apparatus 100b performs the call control cancelling process according to SIP on the image forming apparatus 100a. Subsequently, at step S217, the image forming apparatus 100a transmits "OK" to the image forming apparatus 100b, as a response to the call control cancelling process. As a result, the SIP connection is disconnected, and the peer-to-peer communication between the SIP terminals (the image forming apparatuses 100a and 100b) is ended.

Next, a printing request that is made while the answering machine mode is on and a process related to a printing process performed on the basis of the printing request in the image forming system 10 will be explained, primarily with reference to FIG. 5.

For example, when the image forming apparatus 100a requests the image forming apparatus 100b that is set in the answering machine mode to perform a printing process, the image forming apparatus 100a transmits image data to the image forming apparatus 100b. After that, the image forming apparatus 100b receives and prints the image data, after the answering machine mode is turned off. In the example illustrated in FIG. 5, when the image forming apparatus 100b has received a printing request from the image forming apparatus 100a while the image forming apparatus 100b is set in the answering machine mode, the print/call session controlling section of the image forming apparatus 100b (the controlling section 101) does not perform the printing process as long as the answering machine mode is on, but when the answering machine mode has been turned off, the print/call session controlling section requests the image forming apparatus 100a to transmit the image data and prints the image data received from the image forming apparatus 100a.

More specifically, the image forming apparatus 100a on the transmission side performs the following process: First, when the user instructs via the operating panel 104 that the web screen 500 should be displayed, information (a display request) indicating that the instruction was issued is sent to the operating panel processing section 105, and the display request is further sent from the operating panel processing section 105 to the controlling section 101. When having received the display request, the controlling section 101 activates the web screen processing section 101a. After that, as a result of activating the web screen processing section 101a, a print requesting process while the answering machine mode is on is performed. The print requesting process while the answering machine mode is on is performed by, for example, executing the application (the web application) in the web server 300 via the web screen 500. The print requesting process performed by the image forming apparatus 100a on the transmission side while the answering machine mode is on will be explained below, primarily with reference to FIG. 5.

During the print requesting process mentioned above, first at step S301, by using an "HTTP get", the web screen processing section 101a requests the web server 300 to transmit the web screen 500. When having received the request, the web server 300 transmits the web screen 500 to the web screen processing section 101a of the image forming apparatus 100a.

Subsequently, at step S302, the web screen processing section 101a receives the web screen 500 from the web server 300 and causes the operating panel 104 to display the received web screen 500.

After that, at step S303, the user operates (touches) the transmission-side web screen 500, so as to take out desired image data (image data to be printed) from the second storing area 102b of the auxiliary storage section 102 and to store the image data into a transmission box used in the web application (e.g., a predetermined storage area in the image forming apparatus 100a or a predetermined storage area in the web server 300).

Subsequently, at step S304, the user operates (touches) the transmission-side web screen 500, so that call control according to SIP is exercised on the image forming apparatus 100b on the reception side. In the example illustrated in FIG. 5, the call control corresponds to the printing request.

Next, a printing process performed by the image forming apparatus 100b on the reception side will be explained, primarily with reference to FIG. 5. The image forming apparatus 100b performs the printing process described below, in response to the printing request (more specifically, the call control) described above.

When the call control according to SIP described above is exercised, the image forming apparatus 100b (the controlling section 101) obtains the IP address of the image forming apparatus 100a on the transmission side. Subsequently, at step S305, the image forming apparatus 100b (the controlling section 101) transmits an "answering-machine-mode notice" to the image forming apparatus 100a, as a response to the call control. As a result, a SIP connection is established, and the SIP terminals (the image forming apparatuses 100a and 100b) are thus able to perform peer-to-peer communication with each other through the SIP connection.

After the image forming apparatus 100b has transmitted the "answering-machine-mode notice" to the image forming apparatus 100a, the image forming apparatuses 100a and 100b each perform a call control cancelling process. More specifically, the image forming apparatus 100a performs the call control cancelling process according to SIP on the image forming apparatus 100b (step S306). The image forming apparatus 100b transmits "OK" to the image forming apparatus 100a, as a response to the call control cancelling process (step S307). As a result, the SIP connection is disconnected, and the peer-to-peer communication between the SIP terminals (the image forming apparatuses 100a and 100b) is ended.

After that, when the answering machine mode has been turned off in the image forming apparatus 100b, the image forming apparatus 100b exercises call control according to SIP on the image forming apparatus 100a on the transmission side at step S308.

When the call control according to SIP described above is exercised, the image forming apparatus 100a (the controlling section 101) transmits "OK" to the image forming apparatus 100b at step S309, as a response to the call control. As a result, a SIP connection is established, and the SIP terminals (the image forming apparatuses 100a and 100b) are thus able to perform peer-to-peer communication with each other through the SIP connection.

Subsequently, at step S310, by using an "HTTP get", the image forming apparatus 100b (the controlling section 101) requests the image forming apparatus 100a to transmit image data. When having received the request, the image forming apparatus 100a on the transmission side transmits the image data (the specified image data) stored in the transmission box used in the web application to the image forming apparatus 100b through the SIP connection.

When the network communicating section 109 of the image forming apparatus 100b has received the image data, the received image data (the specified image data) is sent from the network communicating section 109 to the image printing section 110 at step S311. When having received the image data, the image printing section 110 prints the received image data by using the predetermined conditions.

Next, a process performed after the printing process described above will be explained, primarily with reference to FIG. 5.

When the printing process described above has finished, the image forming apparatuses 100a and 100b each perform a call control cancelling process. More specifically, at step S312, the image forming apparatus 100b performs the call control cancelling process according to SIP on the image forming apparatus 100a. Subsequently, at step S313, the image forming apparatus 100a transmits "OK" to the image forming apparatus 100b, as a response to the call control cancelling process. As a result, the SIP connection is disconnected, and the peer-to-peer communication between the SIP terminals (the image forming apparatuses 100a and 100b) is ended.

Figure 5:
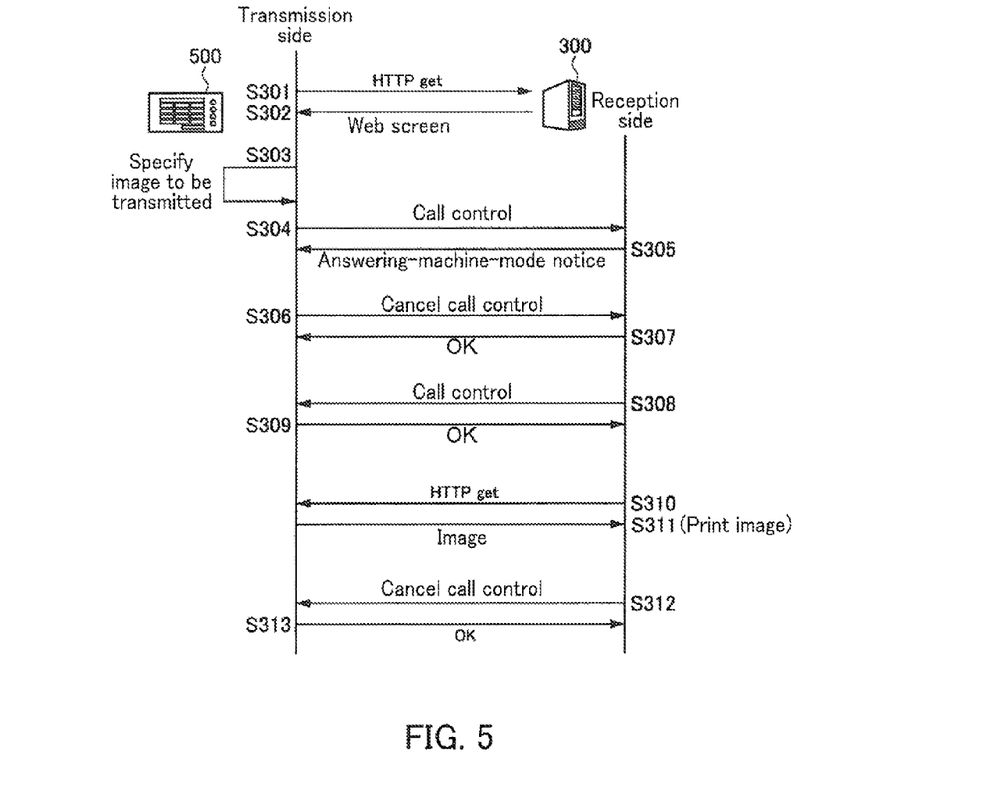
FIG. 5 is a chart showing a procedure in a print requesting process performed while an answering machine mode is on according to the embodiment of the present disclosure.

The manner in which the printing process and the call session are controlled when the image forming apparatus 100b has received a printing request from the image forming apparatus 100a while the image forming apparatus 100b is set in the answering machine mode is not limited to the manner illustrated in FIG. 5. For example, when having received only a printing request from the image forming apparatus 100a between a printing request and a call session request, the print/call session controlling section of the image forming apparatus 100b (the controlling section 101) may, in response to the printing request from the image forming apparatus 100a, request the image forming apparatus 100a to transmit image data and may print the image data received from the image forming apparatus 100a in the same manner as illustrated in FIG. 3, even if the image forming apparatus 100b is set in the answering machine mode.

Figure 6:
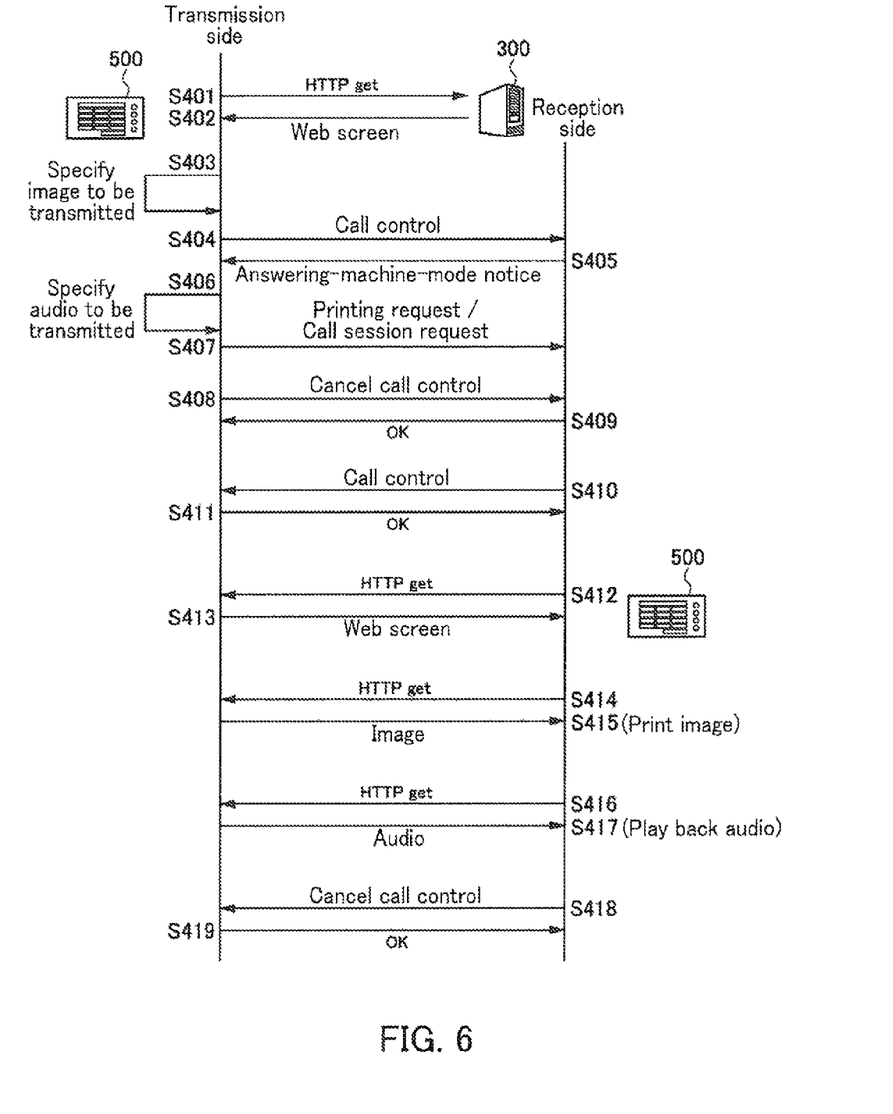
FIG. 6 is a chart showing a procedure in a print requesting process and a call session requesting process that are performed while the answering machine mode is on, according to the embodiment of the present disclosure.

Next, a printing request and a call session request that are made while the answering machine mode is on and processes related to a printing process and an audio playback process performed on the basis of the requests in the image forming system 10 will be explained, primarily with reference to FIG. 6.

For example, when the image forming apparatus 100a requests the image forming apparatus 100b that is set in the answering machine mode to perform a printing process and to have a call session, the image forming apparatus 100a transmits image data and audio data to the image forming apparatus 100b. After that, the image forming apparatus 100b receives and prints the image data and receives and plays back the audio data, after the answering machine mode is turned off. In the example illustrated in FIG. 6, when the image forming apparatus 100b has received both a printing request and a call session request from the image forming apparatus 100a while the image forming apparatus 100b is set in the answering machine mode, the print/call session controlling section of the image forming apparatus 100b (the controlling section 101) neither performs the printing process nor has the call session as long as the answering machine mode is on, but when the answering machine mode has been turned off, the print/call session controlling section requests the image forming apparatus 100a to transmit the image data and the audio data, prints the image data received from the image forming apparatus 100a, and plays back the audio data received from the image forming apparatus 100a. The audio data is generated (i.e., the audio is recorded) when the image forming apparatus 100a has received the answering-machine-mode notice, according to an instruction received by the audio processing section 108 from the audio recording controlling section of the image forming apparatus 100a (the controlling section 101).

More specifically, the image forming apparatus 100a on the transmission side performs the following process: First, when the user instructs via the operating panel 104 that the web screen 500 should be displayed, information (a display request) indicating that the instruction was issued is sent to the operating panel processing section 105, and the display request is further sent from the operating panel processing section 105 to the controlling section 101. When having received the display request, the controlling section 101 activates the web screen processing section 101a. After that, as a result of activating the web screen processing section 101a, a print requesting process and a call session requesting process that are performed while the answering machine mode is on are started. The print requesting process and the call session requesting process that are performed while the answering machine mode is on are performed by, for example, the web application in the web server 300 via the web screen 500. The print requesting process and the call session requesting process that are performed by the image forming apparatus 100a on the transmission side while the answering machine mode is on will be explained below, primarily with reference to FIG. 6.

During the print requesting process mentioned above, first at step S401, by using an "HTTP get", the web screen processing section 101a requests the web server 300 to transmit the web screen 500. When having received the request, the web server 300 transmits the web screen 500 to the web screen processing section 101a of the image forming apparatus 100a.

After that, at step S402, the web screen processing section 101a receives the web screen 500 from the web server 300 and causes the operating panel 104 to display the received web screen 500.

Subsequently, at step S403, the user operates (touches) the transmission-side web screen 500, so as to take out desired image data (image data to be printed) from the second storing area 102b of the auxiliary storage section 102 and to store the image data into a transmission box used in the web application (e.g., a predetermined storage area in the image forming apparatus 100a or a predetermined storage area in the web server 300).

After that, at step S404, the user operates (touches) the transmission-side web screen 500, so that call control according to SIP is exercised on the image forming apparatus 100b on the reception side. When the call control is exercised, the image forming apparatus 100b (the controlling section 101) on the reception side obtains the IP address of the image forming apparatus 100a. Subsequently, at step S405, the image forming apparatus 100b (the controlling section 101) on the reception side transmits an "answering-machine-mode notice" to the image forming apparatus 100a, as a response to the call control. As a result, a SIP connection is established, and the SIP terminals (the image forming apparatuses 100a and 100b) are thus able to perform peer-to-peer communication with each other through the SIP connection.

When having received the "answering-machine-mode notice", the image forming apparatus 100a receives an input of audio for a predetermined period of time. When a user has input a message thereto during the period of time, the message is recorded, so that the recorded message (audio data) is stored into the third storing area 102c. After that, at step S406, the image forming apparatus 100a takes out the audio data (the user's message) from the third storing area 102c of the auxiliary storage section 102 and stores the audio data into a transmission box used in the web application (e.g., a predetermined storage area in the image forming apparatus 100a or a predetermined storage area in the web server 300).

Subsequently, at step S407, the user operates (touches) the transmission-side web screen 500, so as to instruct a printing process and a call session, information (a printing request and a call session request) indicating that the instruction was issued is transmitted from the image forming apparatus 100a to the image forming apparatus 100b (the web screen processing section 101a). The image forming apparatus 100b that is set in the answering machine mode stores information (a received-call history) indicating that the printing request and the call session request were made, into the fourth storing area 102*d* of the auxiliary storage section 102.

Next, a printing process and an audio playback process performed by the image forming apparatus 100*b* on the reception side will be explained, primarily with reference to FIG. 6. In response to the printing request and the call session request described above, the image forming apparatus 100*b* performs a printing process and an audio playback process described below.

After the image forming apparatus 100*a* has transmitted the printing request and the call session request to the image forming apparatus 100*b*, the image forming apparatus 100*a* and the image forming apparatus 100*b* each perform a call control cancelling process. More specifically, at step S408, the image forming apparatus 100*a* performs the call control cancelling process according to SIP on the image forming apparatus 100*b*. At step S409, the image forming apparatus 100*b* transmits "OK" to the image forming apparatus 100*a*, as a response to the call control cancelling process. As a result, the SIP connection is disconnected, and the peer-to-peer communication between the SIP terminals (the image forming apparatuses 100*a* and 100*b*) is ended.

After that, when the answering machine mode has been turned off in the image forming apparatus 100*b*, the image forming apparatus 100*b* exercises call control according to SIP on the image forming apparatus 100*a* on the transmission side at step S410. When the call control is exercised, the image forming apparatus 100*a* (the controlling section 101) on the transmission side transmits "OK" to the image forming apparatus 100*b* at step S411, as a response to the call control. As a result, a SIP connection is established, and the SIP terminals (the image forming apparatuses 100*a* and 100*b*) are thus able to perform peer-to-peer communication with each other through the SIP connection.

After that, at step S412, by using an "HTTP get", the image forming apparatus 100*b* requests the image forming apparatus 100*a* to transmit the web screen 500.

Subsequently, at step S413, the image forming apparatus 100*a* on the transmission side transmits the information about the web screen 500 stored in the first storing area 102*a* of the auxiliary storage section 102 to the image forming apparatus 100*b*. When having received the information about the web screen 500, the image forming apparatus 100*b* causes the operating panel 104 to display the web screen 500 on the basis of the received information.

After that, at step S414, by using an "HTTP get", the image forming apparatus 100*b* (the controlling section 101) requests the image forming apparatus 100*a* to transmit image data. When having received the request, the image forming apparatus 100*a* transmits the image data (the specified image data) stored in the transmission box used in the web application to the image forming apparatus 100*b* through the SIP connection.

When the network communicating section 109 of the image forming apparatus 100*b* has received the image data, the received image data (the specified image data) is sent from the network communicating section 109 to the image printing section 110 at step S415. When having received the image data, the image printing section 110 prints the received image data by using the predetermined conditions.

After that, at step S416, by using an "HTTP get", the image forming apparatus 100*b* (the controlling section 101) requests the image forming apparatus 100*a* to transmit audio data. When having received the request, the image forming apparatus 100*a* transmits the audio data (the user's message) stored in the transmission box used in the web application to the image forming apparatus 100*b* through the SIP connection.

When the network communicating section 109 of the image forming apparatus 100*b* has received the audio data, the received audio data (the user's message) is sent from the network communicating section 109 to the audio processing section 108 at step S417. When having received the audio data, the audio processing section 108 plays back the audio data.

Next, a process performed after the printing process and the audio playback process described above will be explained, primarily with reference to FIG. 6.

When the printing process and the audio playback process described above have finished, the image forming apparatus 100*a* and the image forming apparatus 100*b* each perform a call control cancelling process. More specifically, at step S418, the image forming apparatus 100*b* performs the call control cancelling process according to SIP on the image forming apparatus 100*a*. Subsequently, at step S419, the image forming apparatus 100*a* transmits "OK" to the image forming apparatus 100*b* as a response to the call control cancelling process. As a result, the SIP connection is disconnected, and the peer-to-peer communication between the SIP terminals (the image forming apparatuses 100*a* and 100*b*) is ended.

As explained above, the image forming apparatus 100 according to the present embodiment is configured to be able to cause the operating panel 104 to display the web screen 500 provided by the web server 300 that is determined in advance. Thus, the user is able to perform the operations to transmit the image data and to transmit the audio data by using the web screen 500.

Further, in the image forming system 10 according to the present embodiment, the image forming apparatus 100 on the reception side (e.g., the image forming apparatus 100*b*) is able to obtain the information about the web screen 500 from the image forming apparatus 100 on the transmission side (e.g., the image forming apparatus 100*a*). Thus, the image forming apparatus 100 on the transmission side and the image forming apparatus 100 on the reception side are able to cause the respective operating panel 104 thereof to display mutually the same web screen 500. The user is therefore able to perform the operations to receive the image data and to receive the audio data by using the web screen 500.

As explained above, by using the web screen 500 provided by the web server 300, it is possible to transmit/receive the image data and to transmit/receive the audio data through one connection, without having to install any specific application into the image forming apparatuses 100. Thus, the image forming apparatuses 100 according to the present embodiment are able to transmit/receive the image data even during a call session. Further, when establishing the SIP connection, because the image forming apparatus 100 on the transmission side and the image forming apparatus 100 on the reception side are able to recognize the IP address of each other, protocols such as T.38, RTP, HTTP, and FTP become usable. Further, by using SIP, it is possible to transmit/receive the image data even during a call session, without having to install any gateway apparatus. It is therefore possible to reduce the costs.

When the image forming apparatus 100 on the reception side is set in the answering machine mode, the audio data and the image data are stored into the image forming apparatus 100 on the transmission side. The stored audio data and image data can be transmitted to the image forming apparatus 100 on the reception side at an arbitrary time when the answering machine mode is turned off. By storing the audio data to be played back and the image data to be printed into the image forming apparatus 100 on the transmission side, it is possible to suppress memory consumption of the image forming apparatus 100 on the reception side, which frequently performs the receiving process.

The present disclosure is not limited to the embodiments described above. For example, the present disclosure may be carried out with any of the modifications described below.

The functions in the embodiments described above that are related to controlling the image forming apparatuses 100 may be realized by hardware (an electronic circuit or the like) or by software (e.g., a program). The program executed by the controlling section 101 in the embodiments described above may be configured to be distributable as being stored in a computer-readable recording medium such as a Compact Disk Read-Only Memory (CD-ROM).

The image forming system 10 in the embodiments described above is explained by using the example where the two image forming apparatuses 100 transmit/receive the data between each other. However, the present disclosure is not limited to this example. The image forming apparatuses 100 described above are applicable to a situation where three or more image forming apparatuses 100 transmit/receive data to/from one another.

Each of the image forming apparatuses may be a stand-alone unit (an image forming apparatus having a single function) such as a scanner, a copier, a printer, or a facsimile or may be a multifunction peripheral (an image forming apparatus having multiple functions) that has functions of a scanner/copier/printer/facsimile, for example. Further, each of the image forming apparatuses does not necessarily have to be a stationary image forming apparatus and may be a small-sized portable image forming apparatus. Further, the image transmitting apparatus (the apparatus on the transmission side) does not necessarily have to be an image forming apparatus and may be a portable terminal (e.g., a portable telephone) that is not configured to form images. The image transmitting apparatus may be a portable terminal that has a SIP communication function and is capable of transmitting image data and recording audio. The image forming system may be a system in which a portable terminal (an image transmitting apparatus) transmits image data to a stationary image forming apparatus.

In the embodiments described above, it is possible to arbitrarily modify or omit any of the configurations (the constituent elements, the dimension, the materials, the shapes, the positional arrangements, and the like) of the image forming system 10, as long as the modifications and/or the omissions do not depart from the gist of the present disclosure.

It is possible to arbitrarily combine any of the embodiments, the modification examples, and the like. It is desirable that an appropriate combination be selected in accordance with certain usages or the like.

What is claimed is:

1. An image forming apparatus comprising:
a SIP controlling section configured to establish a connection with another image forming apparatus on a reception side, by communicating with a SIP server;
a web screen obtaining section configured to obtain information about a web screen by making a request to a web server, the web screen being used for receiving an operation to execute an application in the web server;
a display device configured to display the web screen;
a first web controlling section configured to execute the application on a basis of the operation performed on the web screen displayed by the display device and to transmit/receive image data to/from the image forming apparatus on the reception side through the connection;
a second web controlling section configured to execute the application on the basis of the operation performed on the web screen displayed by the display device and to transmit/receive audio data to/from the image forming apparatus on the reception side through the connection; and
a print/call session controlling section that is configured to request the image forming apparatus on the reception side to perform a printing process and to have a call session, is configured to convert audio into predetermined audio data and to record the audio data when having received an answering-machine-mode notice from the image forming apparatus on the reception side, and is configured to transmit image data to be printed and the audio data to the image forming apparatus on the reception side when having received a transmission request from the image forming apparatus on the reception side.

2. An image forming apparatus according to claim 1, wherein
the SIP controlling section establishes the connection by executing the application on the basis of the operation performed on the web screen displayed by the display device.

3. An image forming apparatus according to claim 1, comprising:
a web screen transmitting section configured to transmit the information about the web screen obtained from the web server to the image forming apparatus on the reception side.

4. An image forming system comprising an image transmitting apparatus, an image forming apparatus, a SIP server, and a web server, wherein
the SIP server includes a connection establishing section configured to establish a connection between the image transmitting apparatus and the image forming apparatus,
the web server includes:
an image transmitting/receiving section configured to transmit/receive image data through the connection; and
an audio transmitting/receiving section configured to transmit/receive audio data through the connection, and
the image transmitting apparatus includes:
a SIP controlling section configured to establish the connection by giving an instruction to the connection establishing section;
a first web controlling section configured to transmit the image data to the image forming apparatus by giving an instruction to the image transmitting/receiving section;
a second web controlling section configured to transmit the audio data to the image forming apparatus by giving an instruction to the audio transmitting/receiving section;
a print requesting section configured to request the image forming apparatus to perform a printing process; and
a call session requesting section configured to request the image forming apparatus to have a call session, and
the image forming apparatus includes:
an answering-machine-mode setting section configured to turn an answering machine mode on;

an answering-machine-mode notifying section configured to transmit an answering-machine-mode notice to the image transmitting apparatus, when having received the call session request from the image transmitting apparatus while the answering machine mode is on; and a print/call session controlling section configured to request the image transmitting apparatus to transmit the image data and configured to print the image data received from the image transmitting apparatus, when having received only the printing process request from the image transmitting apparatus between the printing process request and the call session request, while the answering machine mode is on.

5. An image forming system according to claim 4, wherein the web server further includes a web screen transmitting section configured to transmit information about a web screen to the image transmitting apparatus, the web screen being used for receiving an operation to give an instruction to the image transmitting/receiving section and to the audio transmitting/receiving section, the image transmitting apparatus further includes a display device configured to display the web screen, the first web controlling section gives the instruction to the image transmitting/receiving section on a basis of the operation performed on the web screen displayed by the display device, and the second web controlling section gives the instruction to the image transmitting/receiving section on the basis of the operation performed on the web screen displayed by the display device.

6. An image forming system according to claim 5, wherein the SIP controlling section gives the instruction to the connection establishing section on the basis of the operation performed on the web screen displayed by the display device.

7. An image forming system according to claim 5, wherein the image transmitting apparatus further includes a web screen transmitting section configured to transmit the information about the web screen received from the web server to the image forming apparatus.

8. An image forming system according to claim 7, wherein the image forming apparatus includes a display device configured to display the web screen, and the display device included in the image transmitting apparatus and the display device included in the image forming apparatus display a mutually same web screen.

9. An image forming system according to claim 4, wherein the print/call session controlling section requests the image transmitting apparatus to transmit the image data and prints the image data received from the image transmitting apparatus while keeping the connection established, when having received the printing process request from the image transmitting apparatus while having the call session with the image transmitting apparatus through the connection.

10. An image forming system comprising an image transmitting apparatus, an image forming apparatus, a SIP server, and a web server, wherein the SIP server includes a connection establishing section configured to establish a connection between the image transmitting apparatus and the image forming apparatus, the web server includes:
an image transmitting/receiving section configured to transmit/receive image data through the connection; and
an audio transmitting/receiving section configured to transmit/receive audio data through the connection, the image transmitting apparatus includes:
a SIP controlling section configured to establish the connection by giving an instruction to the connection establishing section;
a first web controlling section configured to transmit the image data to the image forming apparatus by giving an instruction to the image transmitting/receiving section;
a second web controlling section configured to transmit the audio data to the image forming apparatus by giving an instruction to the audio transmitting/receiving section;
a print requesting section configured to request the image forming apparatus to perform a printing process; and
a call session requesting section configured to request the image forming apparatus to have a call session, and the image forming apparatus includes:
an answering-machine-mode setting section configured to turn an answering machine mode on;
an answering-machine-mode notifying section configured to transmit an answering-machine-mode notice to the image transmitting apparatus, when having received the call session request from the image transmitting apparatus while the answering machine mode is on; and
a print/call session controlling section that is configured not to perform the printing process as long as the answering machine mode is on, even when having received the printing process request from the image transmitting apparatus while the answering machine mode is on, and that is configured to request the image transmitting apparatus to transmit the image data and configured to print the image data received from the image transmitting apparatus, when the answering machine mode has been turned off.

11. An image forming system comprising an image transmitting apparatus, an image forming apparatus, a SIP server, and a web server, wherein the SIP server includes a connection establishing section configured to establish a connection between the image transmitting apparatus and the image forming apparatus, the web server includes:
an image transmitting/receiving section configured to transmit/receive image data through the connection; and
an audio transmitting/receiving section configured to transmit/receive audio data through the connection, and the image transmitting apparatus includes:
a SIP controlling section configured to establish the connection by giving an instruction to the connection establishing section;
a first web controlling section configured to transmit the image data to the image forming apparatus by giving an instruction to the image transmitting/receiving section;
a second web controlling section configured to transmit the audio data to the image forming apparatus by giving an instruction to the audio transmitting/receiving section;
a print requesting section configured to request the image forming apparatus to perform a printing process;

a call session requesting section configured to request the image forming apparatus to have a call session; and an audio recording controlling section configured to control an operation related to recording of audio, the image forming apparatus includes:

an answering-machine-mode setting section configured to turn an answering machine mode on;

an answering-machine-mode notifying section configured to transmit an answering-machine-mode notice to the image transmitting apparatus, when having received the call session request from the image transmitting apparatus while the answering machine mode is on; and a print/call session controlling section configured to control printing of the image data and playing back of the audio data, the audio recording controlling section performs an audio recording process when having received the answering-machine-mode notice, the print/call session controlling section neither performs the printing process nor has the call session as long as the answering machine mode is on, even when having received both the printing process request and the call session request from the image transmitting apparatus while the answering machine mode is on, and when the answering machine mode has been turned off, the print/call session controlling section requests the image transmitting apparatus to transmit the image data and the audio data, prints the image data received from the image transmitting apparatus, and plays back the audio data received from the image transmitting apparatus.

12. An image forming system according to claim 4, wherein the print requesting section requests the image forming apparatus to perform the printing process, when call control to establish the connection is exercised on the image forming apparatus.

13. An image forming system according to claim 4, wherein the image transmitting apparatus is another image forming apparatus.

\* \* \* \* \*